United States Patent Office
3,072,563
Patented Jan. 8, 1963

3,072,563
METHOD OF DETERMINING CATALYST ACTIVITY IN THE CRACKING OF HYDROCARBON OILS
Donald A. Hickson, Richmond, Calif., assignor to California Research Corporation, San Francisco, Calif., a corporation of Delaware
No Drawing. Filed Dec. 24, 1959, Ser. No. 861,780
1 Claim. (Cl. 208—120)

This invention relates to photoluminescent catalysts and catalyst supports; more particularly, to catalysts and catalyst supports containing a minor proportion of a photoluminescent solid in the catalyst or catalyst support particles.

In the catalytic cracking of petroleum, very large volumes of catalytic material, usually silica-alumina catalyst containing 5 to 50% alumina, are circulated through a conversion zone where hot catalyst is contacted with cracking charge stock and then, after stripping hydrocarbon materials from the catalyst surface, through a regeneration zone where the catalyst contaminated with coke, is regenerated by contacting it with a hot oxygen-containing gas to burn the coke from the catalyst surface and thus simultaneously reactivate the catalyst and reheat it to conversion temperature. In a commercial catalytic cracking unit, hundreds of tons per day of catalyst are passed through the conversion and regeneration zones. As the catalyst is cycled back and forth between the conversion and regeneration zones, there is a very considerable loss of catalyst due to thermal fracture and mechanical abrasion so that catalyst fines are continuously removed from the plant and fresh catalyst is periodically or continuously added to the plant charge to maintain an adequate catalyst inventory within the cracking unit.

In order to follow the operation of a cracking unit and maintain optimum plant control, it would be desirable to extract catalyst samples from each unit which have a known plant history so as to determine the rate at which the activity, selectivity, and surface area of the catalyst change during its life span in the operating unit. Such information would permit the selection of an optimum rate at which to add fresh catalyst to the unit to maintain optimum operating conditions and would facilitate the detection of abnormal plant operation once data on the normal rate of activity decline has been accumulated.

Occasionally it is desirable to compare the performance of two different types or charges of catalyst in an operating unit under identical plant operating conditions in order to determine the relative merits of each. Such information is of value in facilitating the selection of the proper catalyst for any given unit or process, evaluating experimental catalysts, and obtaining direct comparisons of performance.

From time to time in the operation of catalytic cracking units, it may appear desirable to change the specific type of catalyst used in the plant. This proposed change may be simply a substitution of a catalyst, generally similar to the one in the plant, obtained from a different supplier, or it may involve the addition of a considerably different type of catalyst from the standpoint of chemical composition and properties. Since the plant inventory will generally run to several hundred tons, a change is made by introducing the new catalyst as a replacement for that part of the catalyst inventory which is lost through attrition. In the making of such a change of catalyst, it would be desirable to be able to remove a catalyst sample from the plant, segregate the proposed new catalyst, and determine the changes which have occurred under plant conditions in its activity and other significant properties.

The present invention provides a means for attaining these desired objectives.

Pursuant to the present invention, a minor proportion of a thermally-stable, oxidation-stable, reduction-stable, photoluminescent solid is incorporated in the cracking catalyst in the course of its manufacture. When a catalyst containing the photoluminescent solid is added to the plant charge and becomes mixed with it during circulation through the conversion zone and regeneration zone and a sample of the freshly regenerated plant charge is withdrawn for inspection, the sample can be exposed to electromagnetic radiation, such as ultraviolet light, cathode rays and the like, and under such conditions the photoluminescent material within the catalyst particles is excited and, hence, render these particles distinguishable from the remainder of the catalyst charge by virtue of pronounced fluorescence or phosphorescence whence they may be mechanically segregated from the total sample and separately tested for activity and other properties of interest.

The photoluminescent materials incorporated in the catalyst must be thermally stable in the sense that they must be able to withstand temperatures up to at least 1500° F., and preferably to 1800° F., without appreciable loss of photoluminescent activity. They must be oxidation-stable in the sense that they will withstand exposure to the oxidizing conditions prevailing in the regeneration zone, where the catalyst is reactivated and reheated by contacting it with an oxygen-containing gas at temperatures running from 1200° to 1500° F. without appreciable loss of photoluminescent activity, and they must be reduction-stable in the sense that they will withstand exposure to hydrogen gas at temperatures up to about 1200° F. without appreciable loss of photoluminescent activity. Refractory oxides and silicates having a photoluminescent activity are especially useful materials for incorporation in the catalyst particles. Examples of photoluminescent materials which may be incorporated in the catalyst pursuant to the invention include photoluminescent zinc orthosilicate and related derivatives (such as the mineral willemite or zinc beryllium silicates), photoluminescent zirconia, zirconium silicates (such as the mineral zircon), photoluminescent aluminas (such as natural or synthetic rubies and sapphires), photoluminescent magnesium or calcium silicates (such as the lead or europium-activated phosphors), photoluminescent germanates such as the manganese-activated magnesium compounds, photoluminescent alkaline earth phosphates such as the tin-activated calcium and strontium orthophosphates, halophosphates activated with antimony, photoluminescent tungstates and molybdates such as the mineral Scheelite, and photoluminescent halides such as fluorite phosphors activated with uranium or cerium-manganese.

The photoluminescent materials are incorporated into the cracking catalyst in amounts in the range 0.2 to 5% by weight, and generally in the range 1 to 3% by weight. Incorporation of the desired amount of photoluminescent solid into the finished catalyst is readily accomplished by adding finely divided photoluminescent material to the catalyst during the course of its manufacture. In the case of synthetic silica-alumina gel catalysts, the photoluminescent material is intimately mixed with the silica-alumina gel prior to dispersing the gel in an oil bath to form catalyst beads which are subsequently dried. In the case of catalysts prepared by acid activation of naturally occurring clays, the finely divided photoluminescent material is intimately mixed with the heavy clay slurry prior to extrusion and drying. In both instances the finely divided photoluminescent material is uniformly dispersed through the gell or slurry and the finished catalyst is microscopically homogeneous, having the photoluminescent material quite uniformly dispersed in each catalyst particle.

Other siliceous cracking catalysts such as silica-magnesia can be tagged with photoluminescent solid material during the course of manufacture in the same general manner as silica-alumina catalysts.

Silica-alumina cracking catalysts having small amounts of photoluminescent solid materials incorporated in them pursuant to the invention can be used directly as cracking catalysts or can be used as catalyst supports in the preparation of catalysts adapted to accelerate reactions other than simple cracking. For example, silica-alumina cracking catalyst particles having solid photoluminescent materials dispersed in them may be impregnated with metals having hydrogenation-dehydrogenation catalytic activity, for instance, the metals and compounds of the metals of the VI and VIII groups of the periodic table. The photoluminescent materials have low surface area relative to the silica-alumina and so in the impregnation step there is little tendency for the solute in the impregnating solution to come to rest on the photoluminescent materials to a degree that masks their photoluminescent response when subjected to ultraviolet light.

Pursuant to the invention, solid photoluminescent materials may be dispersed in alumina or in silica during the preparation of these materials for use as catalyst supports in the preparation of catalysts intended for use in reactions where little or no cracking activity is desired in the finished catalyst. For example, photoluminescent solids may be incorporated in alumina used as a support for a VI or VIII group metal or metal compound in a catalyst designed to accelerate a simple hydrogenation reaction without appreciable cracking, such as a catalyst consisting essentially of cobalt molybdate supported on alumina. Similarly, the photoluminescent solid materials can be incorporated either in silica or alumina intended as a support for chromium oxide in producing a catalyst effective to dehydrogenate butanes.

The incorporation of photoluminescent solid material into the supports for catalysts comprising a hydrogenation-dehydrogenation component disposed on the surface of the support greatly facilitates the testing of these catalysts under actual plant conditions. In the development of a new catalyst, laboratory scale tests provide an adequate screen of the significant properties of the catalysts, but it is generally recognized that there are frequently differences between laboratory and plant environment which may cause a catalyst which looked very promising on the basis of all laboratory results to behave unsatisfactorily in plant environment. The properties of the catalyst which cause the difference in behavior in the two environments may be elusive, but they are nonetheless real. Present practice is to fill a perforated canister with a sample of a developmental catalyst and place it in the catalyst bed of an operating plant. After some period of exposure to plant conditions the canister is removed and the properties of the catalyst, after exposure, are determined. While the canister is perforated, the flow of reactants through the canister is necessarily inhibited by the canister body and since the catalyst sample is of necessity concentrated in a small area of the bed, it is not necessarily subjected to variations in temperature, which almost always exist in various portions of the catalyst bed. An experimental catalyst having a support in which photoluminescent material has been incorporated can be uniformly dispersed throughout the catalyst bed, circulated through the plant unit, exposed to plant environments in an uninhibited manner, and then separated from a mixed catalyst sample extracted from the catalyst bed by mechanical segregation of fluorescent or phosphorescent particles from bulk catalyst upon irradiation of the mixed sample with electro magnetic radiation, such as ultraviolet light.

In summary, the present invention is directed to new compositions of matter in the form of microscopically homogeneous particles consisting essentially of a major proportion of a material selected from the group consisting of silica, alumina, and silica-alumina, and a minor proportion, less than 5% by weight, of a thermally-stable, oxidation-stable, reduction-stable, photoluminescent solid.

The following examples illustrate the preparation and properties of catalysts of the invention.

*Example 1*

A commercial activated clay-type silica-alumina catalyst containing 48% by weight of alumina and 52% by weight of silica was ground to a fine powder and dried at 110° C. The dry powdered catalyst was mixed with powdered zirconia in amount sufficient to give the mixture a zirconia content of 5% by weight. Then 4% by weight of a stearic acid ester was added to act as a lubricant and binder. The mixture was sieved thoroughly to insure adequate blending and then blended automatically for 2 hours in a mechanical blender. The resultant blend was pelleted and calcined at 1200° F. for 2 hours to burn away the ester. The resulting pellets were hard and bright white in color. Irradiation of the pellets with ultraviolet radiation of 2537 A. wave length caused the pellets to fluoresce a bright white while under direct illumination and to phosphoresce briefly with a green to blue white color upon cessation of illumination.

*Example 2*

A specimen of the mineral willemite, which fluoresced with a brilliant green glow under ultraviolet light, was pulverized and screen through a 35 mesh sieve. The pulverized willemite was mixed with pulverized silica-alumina cracking catalyst, the amount of willemite being sufficient to give a willemite content of 1% by weight in the mixture. The mixture was then pelleted using 8% by weight of a stearic acid ester as a lubricant and the pellets were calcined for 4 hours at 1200° F. The resultant pellets exhibited bright green fluorescent specks homogeneously distributed over the surface and throughout the pellet when exposed to ultraviolet radiation of 2537 A. wave length.

*Example 3*

Pelleted catalyst was prepared as in Example 2, substituting zirconia for willemite. The pellets exhibited bright white fluorescence and green to blue white phosphorescence somewhat less intense than those of Example 1 when exposed to short (2537A.) ultraviolet radiation.

*Example 4*

Pellets prepared as in Example 3 were mixed with pellets of the same cracking catalyst to which no photoluminescent material had been added and were subjected to violent mechanical agitation to cause abrasion of the pellets and production of catalyst fines. After prolonged violent agitation and reduction of the substantial proportion of total mixture to fines, the mixture was screened to separate fines and irradiated under ultraviolet light. 50% of the pellets containing photoluminescent solid were readily removed from the material held on the screen with tweezers.

*Example 5*

Catalyst pellets of compositions similar to those of Examples 1–3, but prepared by extrusion and calcination of a paste of blended phosphors, catalyst, and lubricants as in common commercial manufacturing processes were subjected to treatment with dry air at 1700° F. for 4 hours, during which the surface areas of the pellets were reduced to about one-third their original value. After this treatment the pellets were irradiated with 2537 A. ultraviolet light and exhibited fluorescence substantially equivalent to that exhibited prior to the treatment.

Samples of the pellets prepared in Examples 1, 2, and 3 were treated with steam at 1350° F. for 4 hours, during which the pellets lost approximately 40% of their original surface area. The pellets were then irradiated with 2537 A. ultraviolet light and exhibited fluorescence substantially equal to that exhibited prior to the steam treatment.

*Example 6*

Catalysts of Examples 1, 2 and 3 were employed in "Cat. A" tests (J. Alexander and H. G. Shimp, National Petroleum News (1944), vol. 36, at page R–537; J. Alexander, Proc. A. Petroleum Inst. (1947), vol. 27, at page 51). "Cat. A" activities of the catalysts of Examples 1, 2 and 3 were equal to those of cracking catalysts identical in composition except that they contained no photoluminescent material.

*Example 7*

A mixture of the catalyst of Example 2 and the commercial cracking catalyst employed in making the tagged catalyst of Example 2 was charged to a pilot scale TCC type cracking unit, which was operated for the one week period charging straight run gas oil. During this period the catalyst completed a large number of cycles through the conversion zone and the regeneration zone. During the run conversions and yields were normal in all respects. At the end of the run a sample of the regenerated catalyst was withdrawn and subjected to ultraviolet radiation. Catalyst particles containing photoluminescent solid exhibited essentially undiminished fluorescence and were readily separated from the catalyst mixture with tweezers.

*Example 8*

A sample of synthetic ruby consisting of almost pure alumina was pulverized and sieved through a Number 35 mesh screen. Sufficient powdered ruby was added to a sample of powdered silica-alumina clay type catalyst similar to that of Example 1, to give a mixture 3% by weight in ruby. Pellets were prepared in a similar manner. Illumination with ultraviolet light of 2537 A. wave length revealed intensely red fluorescent specks homogeneously distributed over the surfaces and throughout the pellets. A better response was observed under long (3650 A.) wave length ultraviolet radiation which intensified the red fluorescence.

I claim:

In a process of catalytically cracking a petroleum distillate comprising contacting the distillate at elevated temperature with a siliceous cracking catalyst in a conversion zone, withdrawing coked catalyst from the conversion zone and contacting it with an oxygen-containing gas to burn coke from its surface and reheat and regenerate it in a regeneration zone, returning the regenerated catalyst to the conversion zone, and repeating the sequence of conversion and regeneration, the improved method of determining the amount of change in catalytic properties of the catalyst including activity, selectivity and surface area during passage of the catalyst through the system, which comprises preparing a substantial quantity, related to the total catalyst charge, of fresh siliceous cracking catalyst particles tagged with a minor proportion less than about 5% by weight of a heat-stable, oxidation-stable, reduction-stable photoluminescent solid material uniformly dispersed in the catalyst particles and forming an integral part of said particles, measuring at least one property of said tagged fresh catalyst in which it is desired to determine the amount of change during passage of the catalyst through the system, adding said tagged fresh catalyst to the catalyst charge, circulating the resulting catalyst mixture through the conversion and regeneration zones, withdrawing a sample of freshly regenerated catalyst mixture, irradiating the withdrawn sample with ultraviolet light to cause photoluminescence of the tagged particles in said sample, separating said tagged particles from said sample, and measuring said property of said sample which was also measured prior to circulation of said sample through the system in order to determine by the difference in said measurements the performance of the catalyst in the system, and permit selection of the optimum rate at which to add fresh catalyst, detection of abnormal plant operation, and comparison of performance of different catalysts.

References Cited in the file of this patent

UNITED STATES PATENTS

| 2,936,371 | White et al. | May 10, 1960 |
| 2,938,860 | Guinn et al. | May 31, 1960 |

OTHER REFERENCES

"Handbook of Fluorescent Gems and Mineral," Jack De Ment (page 63), published by Mineralogist Pub. Co., Portland, Oregon, first edition, 1949.

"Using Tracers in Refinery Control," D. E. Hull, April 1955, Nucleonics, vol. 13, No. 4, pages 18 to 21.